April 10, 1956 L. H. CHASE ET AL 2,741,675
VIBRATION DETECTING DEVICE
Filed Oct. 22, 1952 2 Sheets-Sheet 1
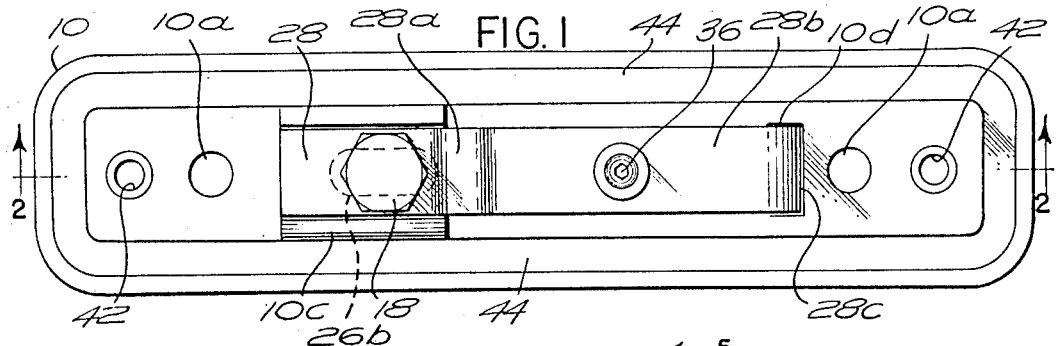
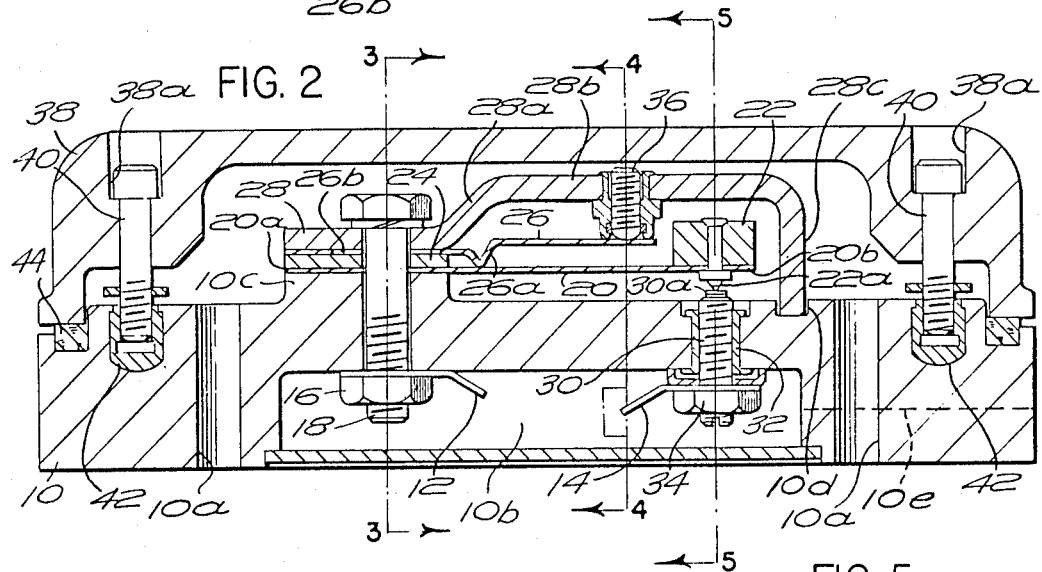
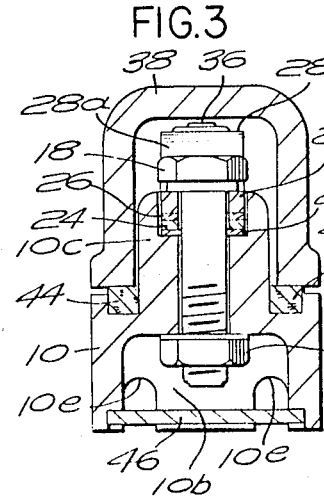 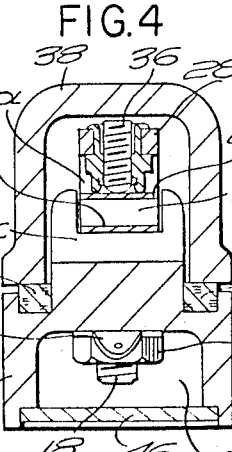 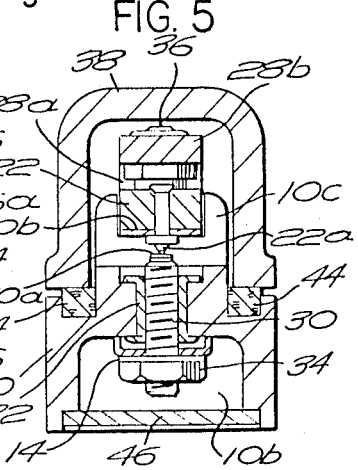
INVENTORS
LELAND H. CHASE
LEROY C. SPENARD
BY
David D. McKinney
ATTORNEY April 10, 1956 L. H. CHASE ET AL 2,741,675
VIBRATION DETECTING DEVICE
Filed Oct. 22, 1952 2 Sheets-Sheet 2
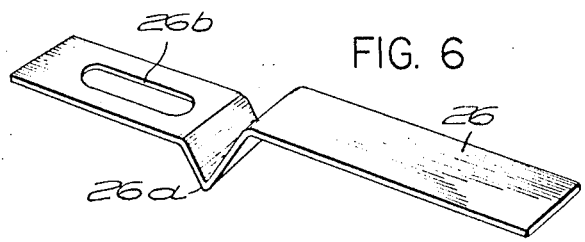
FIG. 6
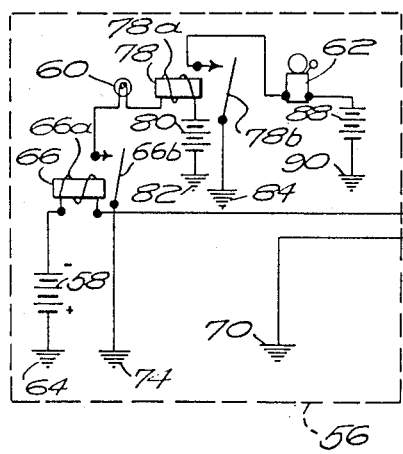
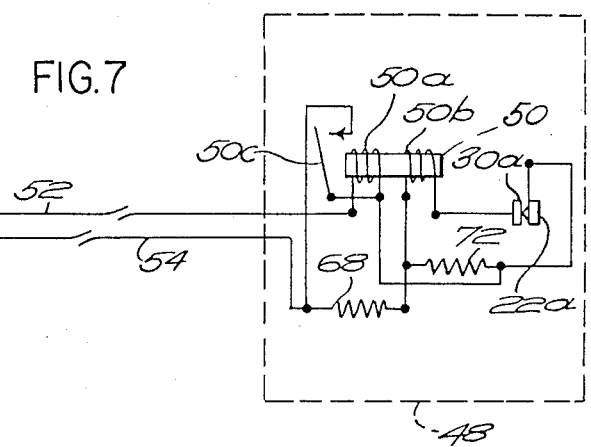
FIG. 7
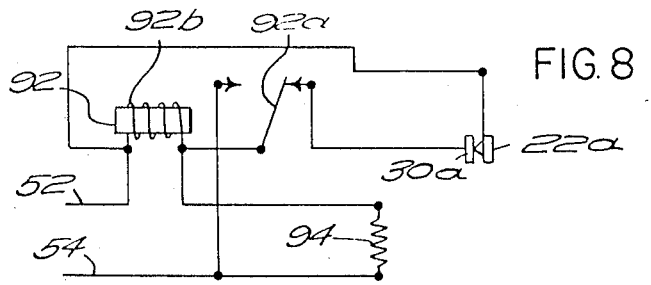
FIG. 8
INVENTORS
LELAND H. CHASE
LEROY C. SPENARD
BY
ATTORNEY

United States Patent Office 2,741,675
Patented Apr. 10, 1956

2,741,675

VIBRATION DETECTING DEVICE

Leland H. Chase and Le Roy C. Spenard, Port Washington, N. Y., assignors to Holmes Electric Protective Company, New York, N. Y., a corporation of New York Application October 22, 1952, Serial No. 316,218

4 Claims. (Cl. 200—61.49)

This invention relates to a vibration detecting device. More especially it has to do with a device which will respond to those vibrations which it is desired to detect and at the same time disregard all other vibrations. The invention is particularly well suited for use in electrical burglar protection systems.

Whenever any burglarious attack is made on the surface of an enclosure vibrations are set up in that portion of the surface directly attacked and frequently in other portions adjoining thereto as well. To utilize these vibrations for the detection of any forcible entry, devices were early proposed which would respond to them and thereby affect alarm circuits in which the devices were installed. In general, the principle of operation has been the same in each of these proposed devices which have come to our attention, each device employing a weighted spring contact which moves relative to a fixed contact when the structure to which the device is secured vibrates appreciably. The relative motion of the several contacts is then used to alter the condition of an associated electrical circuit and an alarm is produced.

This general principle of operation is well conceived in that it makes the devices simple and inexpensive, and we employ it in our improved device. However, we have invented certain improvements which make our device more sensitive to burglarious attacks, without the danger that ambient local vibrations will produce false alarms.

Vibration detecting devices of the type to which the present invention relates are customarily installed on such structures as window and door frames, window mullions, glass panels, floors, ceilings, walls, safes, cabinets and so on, and one of the difficulties with each of those earlier proposed devices which has come to our attention is that local vibrations transferred to such structures often have frequencies which, despite their very low amplitude when they reach the device, nevertheless set up resonance in the weighted spring contact and produce a false alarm. These ambient vibrations may derive from one of a number of sources such as fans, pumps, elevators and other machinery, and our experiments have shown that each weighted spring contact in devices of this type will resonate at a number of frequencies which may be expected from these sources.

Obviously, when there is a burglarious attack a device for detecting it should respond to the resulting vibrations regardless of their frequency. This has been accomplished in the devices heretofore proposed by permitting relative motion of the contacts with respect to each other when the amplitudes of those vibrations which least tend to produce resonance in the weighted spring contact reach values which indicate that the vibrations could accompany a burglarious attack. With this arrangement, however, it follows that the amplitudes of those vibrations which most tend to produce resonance could have values which were very much lower and still give a signal. Consequently, it is immediately apparent that, for a given weighted spring contact, proper setting of the device to detect non-resonance-producing vibrations of burglarious attacks may often result in false alarms from resonance-producing local vibrations.

To avoid these false alarms, when they have occurred from use of the devices heretofore proposed, it has been necessary to adjust the tension in the weighted spring contacts until the amplitude of the resonance-producing local vibrations is insufficient to achieve relative motion of the contacts with respect to each other. The disadvantage of this kind of adjustment is that it simultaneously makes the device less sensitive to those non-resonance-producing vibrations which may herald a burglarious attack.

Accordingly it is an object of the present invention to provide a vibration detecting device in which the vibration characteristics of the weighted spring contact can be altered to avoid resonance which might otherwise be caused by particular local vibrations, this alteration being accomplished without adjustment of the tension in the weighted spring contacts and hence without diminishing the sensitivity of the device to those non-resonance-producing vibrations which might be present during a forcible entry.

Such devices of this general type may be installed to advantage on a wide variety of structures, and since the amplitudes of burglarious vibrations therein to which the devices should be sensitive will differ appreciably, it has been customary to provide for adjustment in the tension of the spring member in the weighted spring contact, as above noted. This tension normally serves to hold the contacts together, and when a device is installed on a very heavy or rigid structure, such as a safe, this tension must be relatively slight so that the device will respond to burglarious vibrations which have very low amplitudes because of the nature of the structure. On the other hand when the device is installed on a very light, unstable structure such as a window frame, the tension of the weighted spring contact must be relatively high so as to avoid false alarms. It is clear, then, that adjustment of the above-mentioned tension throughout a certain range is desirable, and one of the difficulties with the devices heretofore proposed has been that this range has been seriously narrowed by manufacturing errors and tolerances.

It is therefore another object of the present invention to provide a vibration detecting device in which the range of available tensions in the weighted spring contact is substantially unaffected by tolerances and errors in manufacture.

Still another object is to provide a vibration detecting device in which extremely fine changes in the tension in the weighted spring contact can be achieved.

And yet another object is to provide a device having the above-described features and at the same time having a simple and rugged construction and being adaptable to installation in any convenient position on the structure protected.

The best mode in which it has been contemplated applying the principles of the present invention is shown in the accompanying drawings but these are to be deemed primarily illustrative because the patent is intended to cover by suitable expression in the appended claims whatever features of patentable novelty reside in the invention disclosed.

In the accompany drawings:

Figure 1 is a plan view of the improved device with the cover removed;

Figure 2 is a side elevation view in section as on line 2—2 of Figure 1 with the cover in place;

Figure 3 is an end elevation view in section as on line 3—3 of Figure 2;

Figure 4 is another end elevation view in section as on line 4—4 of Figure 2;

Figure 5 is still another end elevation view in section as on line 5—5 of Figure 2;

Figure 6 is a perspective view of one of the leaf springs employed in the device;

Figure 7 is a diagram showing one electrical alarm circuit with which the improved device may be used; and Figure 8 is a diagram showing a portion of another electrical alarm circuit with which the device may be used.

Referring now more particularly to the drawings the improved device has a base block 10 with holes 10a for suitable fastening means (not shown) which serve to attach the device to a structure to be protected, such as a window or door frame, window mullion, glass panel, floor, ceiling, wall, safe, cabinet, vault or other surface subject to vibrations. Preferably the base block is made of some insulating material so that the various electrical conducting elements may be mounted thereon without other insulating means. In a hollow 10b in the base block are located terminal connectors 12 and 14 to which the wires (not shown) leading from alarm apparatus may be connected.

The connector 12 for one of these wires is secured to the base block 10 by a nut 16 threaded on a bolt 18 that extends upward through a boss 10c on the upper side of the block 10. This nut and bolt assembly also serves to secure the boss 10c on end 20a of a spring plate 20 carrying a weight 22 attached to its free end 20b, a spacer washer 24, one end of a leaf spring 26 and a bracket 28. The latter has an inclined portion 28a, a flat portion 28b overlying the leaf spring 26 and a vertical portion 28c which projects downward into a slot 10d on the upper surface of the base 10.

The weight 22 at the free end 20b of the spring plate 20 embodies a contact point 22a which is disposed so that it can engage or disengage another contact 30a on the upper end of a screw 30. This screw is threaded in a sleeve 32 which is suitably shouldered and headed over and is thereby secured to the base block 10. Between the sleeve 32 and a nut 34 threaded onto the lower end of the screw 30 is clamped the other connector 14 for the remaining wire.

In its normal condition contact point 22a is touching contact 30a, thus completing a circuit between the terminal connectors 12 and 14. However, the spring plate 20 is made of a light and highly resilient material so that if there were no force exerted to hold the contacts together very low amplitude vibrations in the structure to which the device is attached would cause the contact point 22a to become separated from contact 30a mounted on the base block.

To avoid such separation upon the occurrence of incipient minor vibrations, whose amplitudes are less than the amplitudes of those vibrations which would accompany burglarious attacks, a force is exerted to hold the contacts 22a and 30a together. This force is derived from an adjustable screw 36 mounted on the bracket 28. Preferably the end of this screw available from above the bracket is of the so-called Allen-head socket type requiring a special wrench to turn it and thus preventing tampering by curious persons or inexpert repair men.

The lower end of screw 36 emerges from the under side of bracket 28 and bears against the leaf spring 26 near its free end, while a reverse V-bend 26a in the leaf spring in turn bears against the spring plate 20 close by where both the leaf spring and spring plate are clamped to the base block boss 10c. Adjustment of screw 36 toward leaf spring 26 produces a similar, though smaller, movement of the leaf spring V-bend 26a toward the spring plate 20. Assuming that contacts 22a and 30a are initially just touching each other, the above-described movement of the V-bend introduces a tension in spring plate 20, and this tension results in a force pressing contact 22a against contact 30a.

This particular arrangement of leaf spring 26 involving, as it does, a mechanical disadvantage permits a very fine adjustment of the force with which the contacts are held together and likewise permits settings which can give this force very low values. This latter feature is important because for some installations it is desired to have these contact forces as low as one half of a gram.

It will be noted that the position of contact 30a may also be adjusted toward or away from contact 22a by turning screw 30 in its sleeve 32. This novel adjustability is essential for maintaining in each individual device the maximum range of possible contact forces despite manufacturing errors. Thus, if contact 30a were not so adjustable, it would be very unlikely that contacts 22a would just barely touch such a fixed contact when the device was first assembled and screw 36 backed off. It is more probable that slight errors in construction or manufacturing tolerances would initially cause contact 22a either to lie above the fixed contact and be separated therefrom or to press against it with some force. Both of these conditions are undesirable because they each narrow the range of contact forces which can thereafter be obtained by screw 36, as will be understood.

Consider first the condition where the contact 22a initially presses against a non-adjustable fixed contact because of errors or tolerances. This initial force holding the contacts together may easily be in the neighborhood of several grams, so that that particular device could not be used where contact forces less than this are required.

On the other hand if the contact 22a is initially separated from the fixed contact, because of errors or tolerances, the resulting gap between the contacts would have to be closed by adjusting screw 36 downward before any contact force could be obtained. The movement of screw 36 required to accomplish this closing is then no longer available for the later achievement of high contact forces. The free end of leaf spring 26 would engage the spring plate 20 and render the device inoperative before a high contact force required for a particular installation could be achieved, which high contact force would be expected of the device and would easily be achieved in a companion device whose contacts were not initially thus separated.

With the provision, in our improved device, of an adjustable contact 30a we make possible an initial setting of this contact so that it just touches contact 22a, screw 36 being backed off. Thereafter all desired contact forces from zero up to the maximum expected from the device are obtainable in each device regardless of its errors or tolerances. These forces are determined, in each case, by the position of screw 36.

The contact force hereinabove referred to must be made adjustable through a certain range because these devices are meant to be installable on a wide variety of structures. In each installation, of course, the device should be set to respond to those vibrations which accompany a burglarious attack on the protected structure and at the same time should ignore local vibrations deriving from nearby machinery or the like. Now it is true that the amplitude of the local vibrations in a safe would be a great deal lower than the amplitude of the same local vibrations in a glass panel. Consequently, to make devices of this kind as sensitive as possible on each structure, and at the same time avoid false alarms, provision is made for the adjustment of contact force as already described. The larger the contact force applied in the device the larger the amplitude of vibration required to separate the contacts and give the alarm.

There is, however, another phenomenon which must be considered in view of the fact that the spring used in devices of this character is essentially a vibrating reed. Frequently local machinery sets up local vibrations in the structure to which the device is attached which cause the vibrating spring to resonate. Consequently, though the amplitude of these resonance-producing vibrations may be well below that which would otherwise cause the device to respond, the contacts separate and a false alarm is produced. This is undesirable, of course, and to correct it by increasing contact force, which can be done, only serves to make the device less sensitive to burglarious attacks. Furthermore, there is considerable likelihood that such resonance will be set up, because the vibrating spring will tend to so resonate in the presence of not one, but rather a number of frequencies spaced apart on the frequency scale, many of which frequencies may be expected from local machinery in normal installations.

To avoid such resonance without sacrificing sensitivity we have provided in our improved device an adjustment for changing the vibration characteristics of the spring plate 20. If, upon installation of our device set for the proper sensitivity, it appears that resonance is set up which renders the device unstable, the point may be changed at which the V-bend 26a in the leaf spring 26 bears against spring plate 20. A slot 26b in the clamped end of leaf spring 26 (see Fig. 6) permits movement of the leaf spring lengthwise of the device by loosening and re-tightening bolt 18. By effecting in this manner a slight shift of the relative position of the V-bend 26 the spring plate 20 is given a new natural period of vibration and will in most cases no longer be resonated by the particular local vibrations encountered. If, by chance, the movement of the V-bend is such that the spring plate 20 again resonates, new positions can be selected for the V-bend until resonance disappears.

Mounted on the base block 10 is a cover 38 having shouldered holes 38a therethrough for Allen-head screws 40 which can be threaded into sunken sleeves 42 in the base block. A cork washer 44 between the peripheral edges of the base block and cover serves as a sort of seal to prevent entry of moisture to the space in which the operating parts of the device are housed. The hollow 10b in the bottom of the base block 10 has grooves 10e leading thereto from one end of the block to accommodate the electrical leads (not shown), and a seal plate 46 covers this hollow to prevent the terminals 12 and 14 from coming into contact with anything on the surface to which the device is secured.

Figure 7 shows diagrammatically our improved device associated with a burglar alarm circuit. The device, represented by the contacts 22a and 30a, is located on the protected premises 48 together with a differential relay 50. Cable conductors 52 and 54 connect these elements on the protected premises to a central office 56 in which there is located an electrical supply source 58, a signal light 60 and bell 62.

Assume that the circuit is in its normal operating condition with contacts 22a and 30a touching each other. In this condition a circuit is established which comprises central office ground point 64, battery 58, the relay windings 66a of a relay 66, cable conductor 52, relay windings 50a of differential relay 50, contacts 22a and 30a in the device, relay windings 50b of differential relay 50, a resistor 68, cable conductor 54 and another central office ground point 70. A resistor 72 is shunted across differential relay windings 50b and the contacts in the device so that only a portion of the current passing through differential relay windings 50a also passes through the oppositely-wound differential relay windings 50b. The current passing through relay windings 50a tends to close the relay operated switch 50c, but when contacts 22a and 30a are closed the current passing through relay windings 50b successfully maintains switch 50c open.

When a burglarious attack occurs contacts 22a and 30a in the device momentarily open. The current through relay windings 50a continues because of the presence of the shunting resistor 72, but the current through relay windings 50b is stopped. Consequently, switch 50c closes and short circuits all the resistance in the elements on the protected premises.

This short circuit results in an increase in the current through the windings 66a of central office relay 66, which increase affects the closing of a relay switch 66b. Closing this latter switch establishes a circuit in the central office 56 comprising a ground point 74, relay switch 66b, signal light 60, relay windings 78a of a relay 78, a battery 80 and another ground point 82. The signal light 60 gives the alarm. Finally, the current flowing through this last-mentioned completed circuit closes relay switch 78b and completes still another circuit comprising a ground point 84, switch 78b, a signal bell 62, a battery 88 and a ground point 90. The signal bell 62 also gives the alarm.

Figure 8 shows diagrammatically a portion of another circuit with which our improved device may be used. The portion shown is that located on the protected premises, the remainder of the circuit being the same as is shown in Fig. 7. In Fig. 8, when contacts 22a and 30a are closed, part of the current from cable conductor 52 passes directly through these contacts to a switch 92a operated by a relay 92. Another part of this current passes through the relay windings 92b of this relay 92, which windings are shunted across the contacts 22a and 30a and the switch 92a. When contacts 22a and 30a are closed there is not enough current in relay windings 92b to actuate switch 92a from the position shown and consequently the current through the device passes through this switch 92a to a resistor 94 and thence back to cable conductor 54. However, when contacts 22a and 30a are separated by vibration the current in relay windings 92b increases sufficiently to actuate switch 92a and thereby short circuit resistor 94. This results in an increase in current flow in the central office and an alarm is given.

We claim:

1. A vibration detecting device comprising a leaf spring, means fixing one end of said spring, a weight secured to said spring at a distance from the fixed end thereof, a first electrical contact carried by said spring at said weight, a fixed member having a part engaging said spring at a point between the fixed end thereof and said weight, said weight and the portion of said spring extending therefrom to said point forming a spring pendulum, said weight being free to move to deflect said spring portion in one direction in response to vibrations, a second electrical contact fixed in a position to engage said first contact with a predetermined pressure when said pendulum is at rest, said second contact non-yieldingly arresting movement of said weight which would substantially deflect said spring portion in the opposite direction, and adjusting means for moving said part of said member parallel to said spring to shift said point of engagement, whereby substantially every part of said weight-carrying spring portion is permitted to deflect in only one direction and whereby the natural period of said arrested pendulum may be changed without substantially varying the contact pressure.

2. A device for detecting vibrations in a structure which device comprises a base, means for rigidly securing the base to the structure, a leaf spring having one end fixed to said base, a weight secured to said spring at a distance from the fixed end thereof, a first electrical contact carried by said spring closely adjacent to said weight, a fixed member mounted on said base and having a part engaging said spring at a point between the fixed end thereof and said weight, said weight and the portion of said spring which extends therefrom to said point forming a spring pendulum which is free to move to deflect said spring portion in one direction upon vibration of the structure, a second electrical contact mounted on said base for non-yieldingly engaging said first contact and preventing movement of said weight which would substantially deflect said spring portion in the opposite direction, said first contact being held against said second contact with a predetermined pressure when said pendulum is at rest, and adjusting means for moving said part of said member substantially parallel to said spring to shift said point of engagement, whereby movement of said weight to substantially deflect any part of said spring portion in said opposite direction is abruptly arrested and whereby the natural period of the pendulum may be changed without substantially varying the contact pressure.

3. A device for detecting vibrations in a structure which device comprises a base, means for rigidly securing the base to the structure, a first leaf spring having one end fixed to said base, a weighted electrical contact secured to said first spring at a distance from the fixed end thereof, a second leaf spring having one end fixed to said base and having a part engaging the first spring at a point thereon between the fixed end thereof and the weighted contact, said weighted contact and the portion of the first spring extending therefrom to said point forming a spring pendulum, a second contact rigidly mounted on said base in engagement with and exerting a predetermined pressure against said weighted contact when said pendulum is at rest, said weighted contact being free to move to deflect said first spring in one direction and being non-yieldingly restrained by said second contact from moving to substantially deflect said first spring means in the opposite direction, adjusting means for moving said second spring part substantially parallel to said first spring to shift the said point of engagement, and additional adjusting means for moving said second spring part toward and away from said first spring, whereby substantially all vibratory movements of said pendulum occur with said first spring portion deflected in the same one direction, whereby the vibration frequencies to which the restrained pendulum most readily responds may be varied without substantially changing the said pretermined contact pressure, and whereby the said predetermined contact pressure may be varied without changing the frequency characteristics of said pendulum.

4. A vibration detecting device for use in an electrical burglar alarm system which device comprises a base, means for rigidly securing said base to a structure subject both to vibrations set up by burglarious attack and to ambient vibrations, a first leaf spring having one end fixed to said base, a weight secured to said first spring at a distance from the fixed end thereof, a second leaf spring secured at one end to said base and extending substantially parallel to said first spring, said second spring having a bent portion extending to and engaging said first spring at a point thereon between the fixed end thereof and said weight, a first contact carried by said first spring at said weight, a second contact rigidly mounted on said base, the weight and first spring portion extending therefrom to said point forming a spring pendulum which is free to move upon vibration to deflect the said first spring portion in one direction from the relaxed position of said first spring and which is prevented from moving to deflect said portion substantially in the opposite direction by non-yielding engagement of said second contact by said first contact, said first contact being held against said second contact with a predetermined pressure when the pendulum is at rest, means mounted on the base at the unsecured end of the second spring to vary said pressure by moving said unsecured end and with it said second spring bent portion toward and away from said first spring, means for adjusting the secured end of the second spring to move the bent poriton substantially parallel to the first spring, and means for adjusting the second contact toward and away from the first contact, whereby the entire said pendulum including the weight is abruptly stopped by said second contact in that part of its vibratory movement which seeks to substantially deflect said spring means in said opposite direction, whereby said contact pressure may be varied without changing the natural period of the pendulum, whereby the natural period of the pendulum may be varied without substantially varying said contact pressure and whereby the second contact may be initially positioned so that thereafter obtaining proper contact pressure does not require excessive contact pressure adjustment.

References Cited in the file of this patent

UNITED STATES PATENTS

| | | |
|---|---|---|
| 1,246,625 | Lundell | Nov. 13, 1917 |
| 1,444,685 | Hopkins | Feb. 6, 1923 |
| 1,837,140 | Thew | Dec. 15, 1931 |
| 2,448,597 | Jolley et al. | Sept. 7, 1948 |